United States Patent
Tumas et al.

(10) Patent No.: US 6,949,238 B2
(45) Date of Patent: Sep. 27, 2005

(54) MICROPOROUS CRYSTALS AND SYNTHESIS SCHEMES

(75) Inventors: William Tumas, Los Alamos, NM (US); Kevin C. Ott, Los Alamos, NM (US); T. Mark McCleskey, Los Alamos, NM (US); Matthew Z. Yates, Penfield, NY (US); Eva R. Birnbaum, Los Alamos, NM (US)

(73) Assignee: The Regents of the University of California, Oakland, CA (US)

( * ) Notice: Subject to any disclaimer, the term of this patent is extended or adjusted under 35 U.S.C. 154(b) by 80 days.

(21) Appl. No.: 10/360,544

(22) Filed: Feb. 5, 2003

(65) Prior Publication Data

US 2004/0151648 A1 Aug. 5, 2004

Related U.S. Application Data

(60) Provisional application No. 60/444,346, filed on Jan. 31, 2003.

(51) Int. Cl.[7] .............................................. C01B 37/04
(52) U.S. Cl. ...................... 423/716; 423/305; 423/306; 423/DIG. 30; 502/208; 502/214
(58) Field of Search ................................ 423/716, 305, 423/306, DIG. 30; 502/208, 214

(56) References Cited

U.S. PATENT DOCUMENTS 5,552,132 A * 9/1996 Evans ......................... 423/701
5,582,819 A * 12/1996 Shul et al. ................... 423/705
5,772,980 A * 6/1998 Sul et al. ..................... 423/705
5,876,690 A * 3/1999 Mou et al. ................... 423/702
2001/0000066 A1 * 3/2001 Rodriguez et al. .......... 208/118
2001/0053744 A1 * 12/2001 Strohmaier et al. ......... 502/214

OTHER PUBLICATIONS

Yates et al., "Hydrothermal Synthesis of Molecular Sieve Fibers: Using Microemulsions To Control Crystal Morphology," Angew. Chem. Int. Ed., vol. 41, No. 3, pp. 476–478, Feb. 1, 2002.*

* cited by examiner

Primary Examiner—David Sample
(74) Attorney, Agent, or Firm—John P. O'Banion

(57) ABSTRACT

Novel zeolites are produced by combining a polar solute, a silicon or phosphorous source, and a structure directing agent. Surfactants and a hydrophobic solvent are added to the previously mixed three species and shaken to disperse the surfactants. The reverse microemulsion is stirred overnight, at about room temperature and then iced for five to ten minutes. A metal source is added vigorously shaken for about two minutes. The mixture is then aged for about two hours at about room temperature. A mineralizer is added and the resultant mixture aged for about two hours at about room temperature. The mixture is heated to about 180° C., for a suitable time period. The final novel product is then isolated.

13 Claims, 11 Drawing Sheets

A

A

B

A

B

MICROPOROUS CRYSTALS AND SYNTHESIS SCHEMES

CROSS-REFERENCE TO RELATED APPLICATIONS

This application claims priority from U.S. provisional application Ser. No. 60/444,346 filed on Jan. 31, 2003.

STATEMENT REGARDING FEDERALLY SPONSORED RESEARCH OR DEVELOPMENT

This invention was made with Government support under Contract Number W-7405 ENG-36 awarded by the United States Department of Energy to the Regents of the University of California. The Government has certain rights in the invention.

REFERENCE TO A COMPUTER PROGRAM APPENDIX

Not Applicable

BACKGROUND OF THE INVENTION

1. Field of the Invention

The subject invention generates novel zeotype framework microporous crystal species via reverse microemulsions in a hydrothermal synthesis process. The subject product's morphology and crystallite size is controlled by the reaction volume.

2. Description of the Background Art

The continued growth of nanotechnology is inherently dependent on the development of new materials and new synthetic methodologies to control morphology on the nanoscale. As many systems such as quantum dots, zeotypes, molecular magnets, and related area rely on complex host-guest interactions during synthesis, there is a need to better understand how these interactions guide the ultimate outcome of the synthesis.

The utility of nanoporous and mesoporous materials having porosity on the order of molecular dimensions and above as adsorbants for gas and liquid separations, catalysts, ion-exchange materials, and biomimetic materials is clear and continues to proliferate rapidly. It has been estimated that refining efficiencies gained by processes based upon nanoporous catalysts save the US approximately 200 million barrels of crude oil imports per year. New nanoporous materials are finding their way into new chemical processing routes as the petrochemical industry responds to increasing foreign competition and environmental regulation. New membrane-based techniques for gas separations, reactive separations, and membrane chemical reactors, and energy storage devices require new materials having porosity on the order of molecular dimensions. Longer range potential applications of nanoporous materials include molecular electronic and electro-optic devices. Discovering new, three-dimensional nanoporous inorganic networks is of key importance to these developing technologies. This requires developing a scientific understanding of the mechanisms of formation of open-framework inorganic compounds and in the understanding of the subtle interactions of the inorganic-organic host-guest complexes involved in their formation. A second crucial factor for the development of nano-scale devices is control over the crystallite morphology of these materials such that control over the orientation of the pore systems with respect to the external environment can be controlled. Current research in zeotypes synthesis that is ongoing around the world is directed at the development and extension of suitable routes for porous materials. The subject invention presents one novel and very useful approach in increasing the rate of discovery of open-framework, nanoporous materials.

Microporous crystals with pore sizes near molecular dimensions, such as zeolites (or zeotypes in general wherein the standard silicon is replaced with other equivalent metals) and molecular sieves (microporous metal oxide crystals in general), are widely used in shape-selective catalysis and separations, and are being developed for applications in membranes, sensors, and optics. (Advanced Zeolite Science and Applications (Ed.: J. C. Jansen), Elsevier, New York, 1994 and M. E. Davis, Ind. Eng. Chem. Res. 1991, 30, 1675–1683.) Because many emerging applications of microporous materials require precise control of crystal size and orientation, (A. Kuperman, S. Nadimi, S. Oliver, G. A. Ozin, J. M. Garces, M. M. Olken, Nature 1993, 365, 239–242 and S. Feng, T. Bein, Science 1994, 265, 1839–1841.) there is significant interest in developing new strategies to control crystal structure and morphology. Reverse microemulsions have been used to control the size and shape of some inorganic materials by confining the reaction within surfactant assemblies. (M. P. Pileni, Langmuir 1997, 13, 3266–3276 and M. Li, H. Schnablegger, S. Mann, Nature 1999, 402, 393–395.) Microporous zincophosphates have also been crystallized at room temperature from reactants enclosed in reverse microemulsions. (P. K. Dutta, M. Jakupca, K. S. N. Reddy, L. Salvati, Nature 1995, 374, 44–46 and R. Singh, P. K. Dutta, Langmuir 2000, 16, 4148–4153.) Zeolites and molecular sieves usually require hydrothermal synthesis conditions (T>100° C.), at which microemulsion formation is difficult to achieve.

The framework structures of zeolites (or zeotypes in general with either silicon or suitable non-silicon equivalents) are complicated networks of interconnected Si—O rings and/or cages, with substitutions of heteroatoms (Al, B, Fe, Ga, Ti, and the like) onto Si sites (or non-silicon equivalent sites). Of the approximately 104 crystallographically and chemically reasonable three-dimensional networks of interconnected tetrahedral vertices predicted by graph theory, only 121 have been synthesized or found in nature, with a few more being synthesized each year. To prepare open-framework zeotypes an organic cation guest molecule (usually referred to as a "structure-directing agent" or SDA) is employed. The SDA directs the formation of molecular-scale inorganic-organic precursors that lead to the nucleation, growth, and crystallization of open-framework materials. The SDA is incorporated into the crystalline matrix, filling the void volumes of channels and cages, and balancing charge of the framework. The SDA is usually removed after crystallization by combustion or pyrolysis, as the SDA is very tightly confined within the surrounding structure. Most of the discoveries of open-framework topologies over the last six to eight years are the result of an increased understanding of the role of the SDA has in preorganizing the inorganic building blocks and stabilizing the open-framework structure once formed.

The subject invention techniques explore new ideas in manipulating the ways in which the synthesis is conducted to step away from the conventional approaches being followed by the zeolite synthesis community. The subject approach controls the reaction volume and medium during the initial growth stages to modulate structure and morphology to produce new framework topologies.

The foregoing information reflects the state of the art of which the applicant is aware and is tendered with the view toward discharging applicant's acknowledged duty of candor in disclosing information which may be pertinent in the examination of this application. It is respectfully submitted, however, that none of the disclosed information teaches, suggests, implies, or renders obvious, singly or when considered in combination, applicant's claimed invention.

BRIEF SUMMARY OF THE INVENTION

An object of the present invention is to provide a reverse microemulsions hydrothermal synthesis method for producing zeotype compounds.

Another object of the present invention is to furnish a hydrothermal synthesis for producing zeotypes in novel crystalline structures.

A further object of the present invention is to supply a reverse microemulsion hydrothermal synthesis method for producing novel $AlPO_4$-5 and Silicalite-1 compounds.

Still another object of the present invention is to disclose zeotype compounds having novel crystalline structures.

Yet a further object of the present invention is to describe $AlPO_4$-5 and Silicalite-1 compounds having novel crystalline structures.

Yet still a further object of the present invention is to disclose $AlPO_4$-5 and Silicalite-1 compounds having novel crystalline structures that are produced by a reverse microemulsion hydrothermal synthesis method.

Disclosed is a method of generating novel zeotype framework microporous crystal species via reverse microemulsions under hydrothermal synthesis conditions. The subject method comprises the steps of: mixing a hydrophilic solute, a silicon or phosphorous source, and a structure directing agent together and then one and usually two surfactants and a hydrophobic solvent are added and shaken to disperse the surfactants. The resultant reverse microemulsion is stirred for a first period of time at a first temperature. A metal source is then added to the stirred reverse microemulsion, either with or without prior cooling of the reverse microemulsion, and shaken vigorously for a second period of time and then allowed to age for a third period of time at a second temperature. A mineralizer is then added and the entire mixture allowed to age for a fourth period of time and a third temperature. The total mixture is heated for a fifth period of time at a fourth temperature. The generated crystals are then isolated as the subject product.

More specifically, the subject method, for a novel exemplary $AlPO_4$-5 species, comprises mixing water, phosphoric acid, and triethylamine together. Then cetyl pyridinium chloride, n-butanol, and toluene are added and shaken for approximately a minute to disperse the cosurfactants. The resultant reverse microemulsion is stirred overnight at about room temperature. Aluminum triisopropoxide is then added to the stirred reverse microemulsion, either with or without an approximately five to ten minute ice cooling of the reverse microemulsion, and shaken vigorously for about two minutes and then allowed to age for approximately two hours at room temperature. Hydrofluoric acid is then added and the entire mixture allowed to age for about two hours at room temperature. The total mixture is heated, by conventional or microwave heating, is heated to about 180° C. for an appropriate period of time, depending on the heating technique. The generated crystals are then isolated, washed, and dried as the subject product.

An equivalent procedure is utilized to produce a novel form of Silicalite-1, as described below.

The subject invention has led to a better understanding of how zeolites and related compounds nucleate and grow. Understanding nucleation processes helps in developing new nanoporous materials having novel catalytic and separation capabilities. In particular, control over the morphology of the crystal growth through the use of reverse microemulsions is particularly challenging because the hydrothermal synthesis requires elevated temperatures and high concentrations of ions. Such control can be extended to the morphology of a wide range of complex materials including molecular magnets and nonlinear optic materials. In the area of zeolites, morphology control has direct applications in the development of zeolite based membranes for separations that are currently plagues by lack of control over orientational effects and imperfections leading to inconsistent results.

Other objects, advantages, and novel features of the present invention will become apparent from the detailed description that follows, when considered in conjunction with the associated drawings.

BRIEF DESCRIPTION OF THE DRAWINGS

The invention will be more fully understood by reference to the following drawings which are for illustrative purposes only:

FIG. 2A is a scanning electron micrographs of $AlPO_4$-5 synthesized by microwave heating at 180° C. for 17 minutes showing $AlPO_4$-5 from a microemulsion based synthesis (bar equals 1 micron); b) $AlPO_4$-5 from traditional synthesis (bar equals 10 microns).

FIG. 2B is a scanning electron micrographs of $AlPO_4$-5 from traditional synthesis using microwave heating (bar equals 10 microns).

FIGS. 2A to 2D correspond to microemulsion compositions A to D respectively from FIG. 4. FIG. 2E is the control experiment without the microemulsion. The scale bars are 20 microns for A, B, and D; 200 microns for C and E.

FIGS. 7A to 7D correspond to microemulsion compositions A to D respectively from FIG. 4. FIG. 4E is the control experiment without the microemulsion. The scale bars are A-10 $\mu$m, B-2 $\mu$m, C-20 $\mu$m, D-2 $\mu$m, and E-20 $\mu$m.

FIG. 8A is from a microemulsion with composition C' on FIG. 4. FIG. 8B is the control experiment without the microemulsion. The scale bars are 200 $\mu$m.

FIG. 9A is from a microemulsion with composition A' on FIG. 4. FIG. 9B is the control experiment without the microemulsion. The scale bars are A-2 $\mu$m and B-20 $\mu$m.

DESCRIPTION OF THE PREFERRED EMBODIMENT(S) OF THE INVENTION

Figure 1:
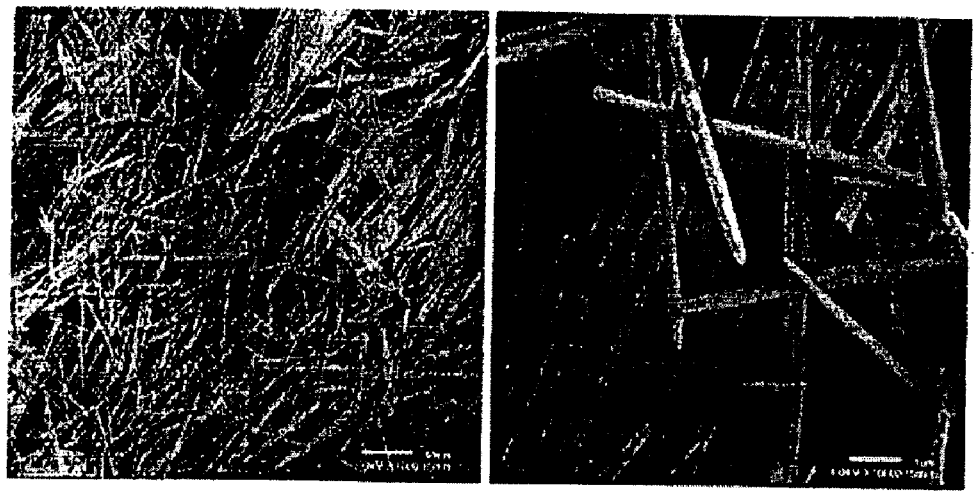
FIG. 1A is a scanning electron micrographs of $AlPO_4$-5 synthesized in an autoclave at 180° C. for six hours showing $AlPO_4$-5 from microemulsion-based synthesis (bar equals 10 microns).
FIG. 1B is a scanning electron micrographs of $AlPO_4$-5 synthesized in an autoclave at 180° C. for six hours showing a close-up of fiber ends of $AlPO_4$-5 from microemulsion-based synthesis (bar equals 1 micron).
FIG. 1C is a scanning electron micrographs showing $AlPO_4$-5 from a traditional synthesis using an autoclave for heating (bar equals 10 microns).
Figure 1:
Figure 2:
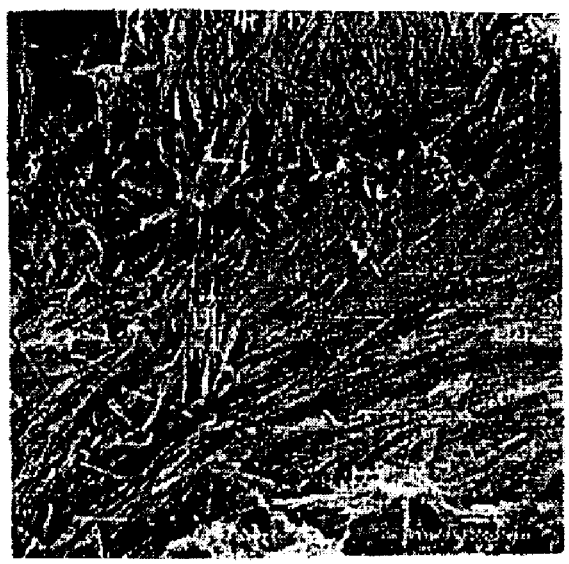
Figure 2:
Figure 3:
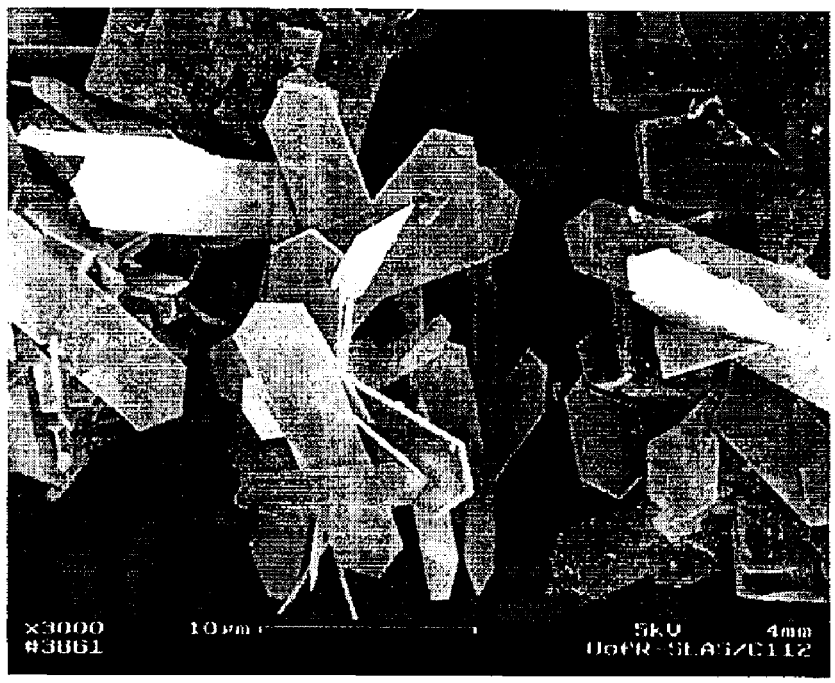
FIG. 3A is a scanning electron micrographs of Silicalite-1 from the subject synthesis scheme (bar equals 10 microns).
FIG. 3B is a scanning electron micrographs of Silicalite-1 from a traditional synthesis scheme (bar equals 10 microns).
Figure 3:

The subject invention is concerned with certain classes of nanoporous materials that are prepared under hydrothermal synthesis conditions, such as zeolites (framework silicates consisting of interlocking tetrahedrons of SiO$_4$ and AlO$_4$) and their non-silicate analogs such as, but not limited to, aluminophosphates, where phosphate, for example, assumes the role of the silicate (collectively known as zeolite-types or zeotypes). Zeotypes are crystalline open framework materials having porosity on the order of molecular dimensions. These nanoporous materials have found tremendous technological utility as shape-selective catalysts, adsorbents, and ion exchangers, Scientifically, there is a keen interest in the mechanism of the nucleation and growth of these wonderfully complex structures and in the nature of the guest-host interactions that direct the formation of these complicated frameworks. The subject invention provides new approaches to influence the nucleation and growth of zeotypes grown under hydrothermal conditions. The subject techniques permit manipulations, in well-controlled fashion, of the chemical and physical environment in which these syntheses are performed.

Referring to the drawings (FIGS. 1–11), for illustrative purposes, the present invention is disclosed for synthesizing complex metal oxide species, microporous metal oxide crystals, at hydrothermal conditions using microemulsions. More specifically, reverse microemulsions are utilized to synthesize high aspect ratio zeotype microporous crystals at the nanoscale. The zeotype microporous crystals are made in reverse microemulsions under hydrothermal conditions. It is believed that prior to the subject invention, microemulsion synthesis above 80° C. was unknown. The synthesis in reverse microemulsions results in zeotype microporous crystals that have aspect ratios up to 100 or more. The pores of the zeotype microporous crystal are aligned along the axis so that it may be possible to make zeotype membranes from such fibers. Aspect ratios for crystal species are also important for magnetic properties, optical materials to generate polarized light, and physical properties of composites. The subject synthesis method opens up a whole new area by making it possible to synthesize a much broader range of materials in microemulsions to control the product's morphology.

Reverse microemulsions are one mechanism to control features on the nanoscale by limiting the growth of crystals or acting as a reaction volume template to control aspect ratios. The control over complex systems such as zeotypes is a challenge, especially when hydrothermal synthesis at temperatures usually >100° C. are required and the number of interacting components is large. Microemulsions result from the interaction of a surfactant with "water-oil" mixture. Traditional microemulsions have the water (hydrophilic/polar material) as the solvent and the oil (hydrophobic/non-polar material) as the solute, wherein the surfactant separates the two phases. In reverse microemulsions, as is the case with the subject invention, the solvent phase is the non-polar material and the solute phase is the polar water, still separated by the surfactant. Microemulsions and reverse microemulsions differ from traditional micelles in that traditional micelles are produced from amphipathic species and water and no separate surfactant is required for solubilization, however, it is pointed out that traditional micelle structures may be the basis for similar reactions or equivalent to those disclosed below for the subject microemulsion situation and are therefore considered within the disclosed bounds of this disclosure.

For example, a illustrative microemulsion forming system can be generated with a cationic SDA and appropriate mineralizer (OH—, pH of about 13, or F—, pH of about 7) partitioned into the interior aqueous phase within the microemulsion. Silicate is introduced by diffusion through the surfactant wall using non-polar silicate precursors such as tetraethylorthosilicate, Si(OEt)$_4$. This exemplary approach offers many advantages, The silicate precursor can be metered into the reaction vessel, controlling the rate of diffusion through the microemulsion wall. Particularly, hydrophobic SDA species may also be partitioned between the water and oil phases, thereby lending control over the SDA concentration in the aqueous reaction volume. Once the nucleation begins, the particle size may be controlled by the volume of the emulsion reaction compartment. Particles can then only grow by emulsion-emulsion collisions and agglomeration and so preparation of zeotypes having narrow crystallite size distributions or aspect ratios is possible.

More specifically, disclosed is the use of reverse microemulsions to control the morphology of crystals zeotypes, such as, but not limited to, common aluminophosphate molecular sieve (AlPO$_4$-5) and a zeolite (Silicalite-1), during hydrothermal synthesis at elevated temperatures above 100° C., usually at approximately 180° C. or more. By way of example and not by way of limitation, for the AlPO$_4$-5 species, very long fibers are obtained in the microemulsion-based synthesis, a morphology not observed previously for AlPO$_4$-5. These fibers have linear micropores parallel to the long axis of the fibers. The high aspect ratio of the fibers should allow their incorporation into materials with controlled crystal orientation. Similarly, the microemulsion approach could be used to control morphology of other complex materials.

To illustrate the subject method in more detail, two exemplary species will be utilized: AlPO$_4$-5 (an aluminophosphate or zeotype) and Silicalite-1 (a typical zeolite), but it is stressed that other equivalent species are considered to be within the realm of this disclosure. Aluminophosphates are a widely studied class of microporous materials containing a variety of structural types. (S. T. Wilson, B. M. Lok, C. A. Messina, T. R. Cannan, E. M. Flanigen, J. Am. Chem.

Soc. 1982, 104, 1146–1147.) Aluminophosphate number five ($AlPO_4$-5) was selected to be synthesized because it is one of the most common molecular sieves and has found application in catalysis, nonlinear optics, and membrane separations. (J. Caro, F. Marlow, K. Hoffmann, C. Striebel, J. Kornatowski, I Girnus, M. Noack, P. Kolsch, Stud. Surf. Sci. Catal. 1997, 105, 2171.) The crystal structure has the IUPAC name AFI and forms parallel linear pores with uniform diameters of 0.7 nm.

Generally, the composition utilized in the subject synthesis scheme comprises: 1) a polar solute; 2) an aluminum source; a silicon or phosphorous source; 3) an organic structure-directing agent (SDA); 4) a mineralizer; 5) at least one surfactant; and 6) a non-polar solvent.

A First Embodiment Synthesis Scheme

With more specificity, an exemplary subject synthesis route for producing $AlPO_4$-5 begins with a mixture of water, the aluminum source, the phosphorus source, the organic SDA, and appropriate mineralizer such as hydrofluoric acid, hydroxide, or equivalents. Phase behavior measurements on several surfactant systems were conducted to identify surfactants capable of solubilizing all of the components of the $AlPO_4$-5 synthesis mixture into a water-in-oil microemulsion. The mixture was treated as a pseudo-ternary system, with oil, aqueous, and surfactant components. Toluene was chosen as the oil phase or non-polar solvent. Specifically, the aqueous phase was an $AlPO_4$-5 synthesis mixture consisting of water, aluminum triisopropoxide, phosphoric acid, hydrofluoric acid, and triethylamine in a molar ratio of 50:0.8:1.0:0.5:1.2, respectively. (J. Caro, I. Girnus, Microporous Mater. 1998, 22, 560–661.) The surfactant was a mixture of an ionic surfactant and n-butanol. The alcohol was added as a cosurfactant to improve microemulsion formation. (M. Kahlweit, R. Strey, G. Busse, J. Phys. Chem. 1991, 95, 5344–5352.) Three ionic surfactants were investigated; sodium dodecyl sulfate, cetyl trimethylammonium bromide, and cetyl pyridinium chloride. Various concentrations of surfactant and aqueous phases in toluene were examined to determine regimes where an optically transparent, single-phase microemulsion formed at room temperature. It was determined that cetyl pyridinium chloride in a 2:1 weight ratio with n-butanol had the largest single-phase region, and was capable of solubilizing the greatest amount of the $AlPO_4$-5 synthesis mixture.

The mass fractions of components used for the hydrothermal synthesis were 0.219 cetyl pyridinium chloride, 0.109 n-butanol, 0.492 toluene, and 0.180 $AlPO_4$-5 synthesis mixture.

The microemulsion was formed by first mixing water, phosphoric acid, and triethylamine together at room temperature for five minutes. Then, cetyl pyridinium chloride, n-butanol, and toluene were added and the mixture was vigorously shaken for two minutes. At this point, a single-phase microemulsion formed. The microemulsion was aged overnight while stirring at room temperature. Aluminum triisopropoxide was then added and the mixture was shaken vigorously for one minute. Cooling the reaction on ice prior to addition of aluminum triisopropoxide is a desired additional step. If this additional cooling step is not performed, a larger amount of impurities appear to be incorporated into the product and the obtained $AlPO_4$-5 crystals frequently do not have the desired fibrous shape. It is noted that occasionally a reaction conducted without this cooling step does yield the desired product. With cooling on ice, the results are consistent.

After the addition of the aluminum source, the microemulsion was aged at room temperature for two hours. Hydrofluoric acid was then added and the microemulsion was aged for an additional two hours. At room temperature, this mixture forms a transparent single-phase microemulsion, unlike the traditional $AlPO_4$-5 synthesis mixture that appears milky white. Hydrothermal synthesis was conducted by heating the microemulsion to 180° C., with stirring, in a Teflon-lined autoclave for six hours. For a desired reproducible final product, turning off the stirring, once the reactor reached the desired reaction temperature, was preferred. If stirring was maintained throughout, the stirring sometimes caused the final product to be a different crystalline structure (a quartz-like structure called berlinite). This effect did not happen for all reaction conditions, but it consistently happens for some.

A control was also performed by using the same synthesis conditions, but without toluene, surfactant, and butanol. The solid product was collected by centrifugation, washed with ethanol, and dried overnight in a vacuum oven at 50° C.

The microemulsion-based synthesis resulted in the formation of long fibers approximately 200–300 nm in width and 15–30 microns in length (see FIG. 1A), with some groups of fibers aggregated into parallel bundles. The widths of the fibers are very uniform, while the lengths of the fibers vary a great deal. The blunt ends observed on many fibers (see FIG. 1B), as opposed to sharp points, suggest that these fibers may have been broken during transfer to the scanning electron microscopy stage. By comparison, the traditional synthesis resulted in the formation of irregular hexagonal columns approximately 4–8 microns in width and 5–12 microns in length (see FIG. 1C). The hexagonal columns appear in a wide variety of sizes. The surfaces of the columns are rough, indicating that they are likely composed of multiply twinned crystals. The powder X-ray diffraction pattern for the material synthesized through the microemulsion-based synthesis is consistent with the AFI structure, and appears similar to the $AlPO_4$-5 diffraction patterns in the literature. (M. M. J. Treacy, J. B. Higgins, R. von Ballmoos, Collection of Simulated XRD Powder Diffraction Patterns for Zeolites, Elsevier, London, 1996.) The one notable difference is the greatly reduced intensity of the (002) peak located at a Bragg angle $2\Theta$ of 21.3°. The loss of intensity of the (002) peak indicates that the fibers are preferentially oriented horizontally, which is consistent with the observed orientation in FIG. 1A. From the preferred orientation of the fibers, it can be concluded that the linear micropores are parallel to the long axis of the fibers.

Microwave heating was explored as an alternative route for the synthesis of $AlPO_4$-5 from reactants enclosed in water-in-oil microemulsion droplets. Microwave heating often reduces the crystallization time and/or temperature required for hydrothermal synthesis of zeolites and molecular sieves, including $AlPO_4$-5. (I. Girnus, K. Jancke, R. Vetter, J. Richter-Mendau, and J. Caro, Zeolites 1995, 15, 33–39 and J. P. Zhao, C. Cundy, and J. Dwyer in Progress in Zeolite and Microporous Materials (Eds.: H. Chon, S. K. Ihm, Y. S. Uh), Elsevier, London, 1997, pp. 181–187.) Microemulsions were prepared by using the same procedure described above and then heated in a Teflon-lined vessel to 180° C. for 17 minutes in a commercial microwave. FIG. 2A shows the scanning electron micrograph of the product formed within the microemulsion after microwave heating. As with the synthesis in the autoclave, a fibrous product is produced. However, the particle size is much smaller, with widths of approximately 150 nm and lengths of up to 2–3 microns. The smaller fibers also display some tendency to aggregate into parallel bundles. For comparison, FIG. 2B shows the product formed from heating the traditional synthesis mixture in the microwave. The product appears as multiply twinned crystals up to 50 microns in length and 10–15 microns in diameter, and is similar to the barrel-like morphology described by Wilson in the original synthesis of $AlPO_4$-5. (S. T. Wilson, B. M. Lok, C. A. Messina, T. R. Cannan, E. M. Flanigen in Intrazeolite Chemistry (Eds.: G. D. Stucky and F. G. Dwyer), American Chemical Society, Washington, D.C., 1983, pp. 79–106.) The powder X-ray diffraction patterns for the products from both the traditional synthesis and the microemulsion synthesis confirm the AFI crystal structure (not shown). There is a slight reduction in the intensity of the (002) peak located at a Bragg angle $2\Theta$ of 21.3° for both products, but not as much as observed for the longer fibers synthesized in the autoclave. Apparently, the smaller aspect ratio of the fibers produced in the microwave (10 compared to 100 for the fibers produced in the autoclave) reduces the preferred horizontal orientation.

General Hydrothermal Synthesis Conditions: Autoclave synthesis was conducted in a Teflon-lined pressure vessel (Parr, model 4744) wrapped in heating tape and controlled to a temperature of 180° C. for six hours. The reactor contents were stirred continuously using a magnetically coupled Teflon stir bar. Microwave synthesis was conducted in Teflon acid digestion vessels in a CEM MDS-2000 oven. The vessels were heated to 180° C. for 17 minutes without stirring.

General Powder X-ray Diffraction Conditions: Spectra were collected by using a Scintag XDS2000 diffractometer using an accelerating voltage of 45 kV and intensity of 40 mA. The diffraction pattern was collected from an angle $2\Theta$ of 5 to 50°, using a step size of 0.02° and a collection time at each step of three seconds. Scanning electron micrographs were obtained by using a JEOL 6300FX high-resolution scanning electron microscope operating at an accelerating voltage of 1.0 kV.

A Second Embodiment Synthesis Scheme

A novel form of Silicalite-1 was synthesized by the subject method. The aqueous phase comprised silica, ammonium fluoride, tetrapropylammonium bromide, and water in a ratio of 1:1:0.4:40, respectively. The non-aqueous phase comprised cetyl pyridinium chloride, n-butanol, and toluene. Aluminum triisopropoxide was added as above. The novel crystals shown in FIG. 3A were synthesized via the subject reverse microemulsion procedure and heated for six days at 180° C. by conventional heating. The "control" crystals shown in FIG. 3B did not contain the non-aqueous phase, but were heated for six days at 180° C. using conventional heating. The subject reverse microemulsion process produced crystals that shaped like thin plates and smaller (FIG. 3A) than the "coffin-shaped" crystals found in the conventional preparation (FIG. 3B).

Detailed Phase Diagram and Crystal Size/Shape Studies for $AlPO_4$-5

As noted above in the first embodiment example of the subject invention, $AlPO_4$-5 was synthesized in the subject fibrous morphology by hydrothermal synthesis in a water-in-oil microemulsion. The surfactant cetyl pyridinium chloride with cosurfactant butanol solubilizes the standard aqueous $AlPO_4$-5 synthesis gel into a single phase microemulsion in toluene that is thermodynamically stable at room temperature. Several pseudo-ternary phase diagrams were measured to map the single-phase microemulsion region at room temperature and used as a guide for hydrothermal synthesis. By changing the composition of microemulsions, the crystal size and shape could be varied. The $AlPO_4$-5 crystal morphology changed from individual fibers to "fan-like" aggregates of fibers as the ratio of aqueous gel to surfactant was increased. As the ratio of toluene to aqueous gel increased, the formation of the dense phase aluminum phosphate berlinite was favored. Since the organic structure directing agent is not only soluble in aqueous phase but in the toluene phase, the concentration of the structure directing agent in the aqueous phase decreases with increasing amount of toluene and dense phase aluminum phosphate becomes the favored product. It was determined that double the standard amount of triethylamine is necessary for synthesis of high purity of $AlPO_4$-5 in the microemulsion.

Similar trends in crystal morphology were observed using microwave synthesis and conventional synthesis. The crystal size was typically smaller for microwave synthesis and there was less dense phase aluminum phosphate formation. Microwave energy offers faster crystallization time, 17 minutes versus approximately six hours for conventional synthesis. The microwave heating of water-in-oil microemulsions also offers the unique advantage of selective heating of the microemulsion droplets. Since many oils are transparent to microwaves, the aqueous droplets are rapidly and selectively heated within the oil.

The mechanism of the modification of crystal morphology is not simple templating by confinement within microemulsion droplets. The microemulsion influences crystal morphology in the very early stages of nucleation and growth, possibly by influencing the amorphous precursor particles that form at room temperature and act as nucleation sites. The final crystal size is larger than the microemulsion droplets, so continued growth must occur through solution transport outside of the microemulsion. The novel fibrous $AlPO_4$-5 morphology may allow oriented deposition onto substrates for formation of membranes or optical devices.

Several pseudo-ternary phase diagrams were constructed to map the single-phase microemulsion region. The phase diagrams were used as a guide for hydrothermal synthesis at various microemulsion compositions. Crystallization of $AlPO_4$-5 was achieved at 180° C. either by conventional heating of the microemulsion for six hours or microwave heating for 17 minutes. The $AlPO_4$-5 crystal morphology changes from individual fibers to "fan-like" fiber aggregates as the ratio of $AlPO_4$-5 gel to surfactant increases. As the ratio of toluene to surfactant increases, nonporous berlinite becomes the favored product due to partitioning of the structure directing agent into toluene. Microwave heating produces smaller fibers and less dense phase aluminum phosphate than conventional heating. The highly anisotropic $AlPO_4$-5 fibers may possibly allow easier control of crystal orientation when forming thin films for applications in membranes and optics. The microemulsion approach presented is applicable to hydrothermal synthesis of a variety of zeolites and molecular sieves to potentially control crystal morphology.

Experimental

Materials: Phosphoric acid (85%), triethylamine (99.5%), butanol (99.4%), toluene (99.5%), hydrofluoric acid (48%), cetyl pyridinium chloride (CPC, 98%) and aluminum triisopropoxide (99.99%) were purchased from Aldrich and used as received. Because of its sensitivity to moisture, aluminum triisopropoxide was stored in a desiccator.

Determination of Phase Diagrams: The measurement of the single phase region of microemulsion formation was described previously. (Yates, M. Z.; Ott, K. C.; Birnbaum, E. R.; McCleskey, T. M. *Angew. Chem. Int. Ed.* 2002, 41, 476–478) The molar ratio of the components in the aqueous phase was kept constant and based on a synthesis gel composition for AlPO$_4$-5 from the literature. (Robson, H. *Microporous Mesoporous Mater.* 1998, 22, 495–670) For standard condition, the aqueous mixture is composed of water, aluminum triisoproxide, phosphoric acid, triethylamine, and hydrofluoric acid in a molar ratio of 50:0.8:1.0:0.6:0.5 respectively. The phase diagram was also investigated with double the molar ratio of triethylamine (1.2 moles per mole phosphoric acid). First, the aqueous AlPO$_4$-5 synthesis gel was formed and stirred at room temperature for approximately four hours. In a second vial, CPC, butanol, and toluene were added. The AlPO$_4$-5 synthesis mixture was added in increments to the second vial. After each addition of the aqueous mixture, the vial was stirred for a few minutes before visual observation. As the aqueous mixture was added, there was a sharp transition from a turbid mixture to an optically transparent single phase. Further addition of the aqueous mixture eventually led to the return of a turbid multiphase mixture. The single-phase region can be mapped on a ternary phase diagram by repeating the process with different toluene/surfactant weight ratios. The phase diagram was used as a guide in selecting different compositions within the optically transparent single phase region for hydrothermal synthesis.

Hydrothermal Synthesis: De-ionized water, phosphoric acid, and triethylamine were first mixed together. It is preferred to mix triethylamine and phosphoric acid together first to allow the acid-base reaction and minimize the solubility of triethylamine in the oil phase by formation of a salt with phosphoric acid. Then, cetyl pyridinium chloride, butanol, and toluene were added and shaken for one minute to disperse the surfactants. At this point, a clear single phase microemulsion had formed. The microemulsion was stirred overnight at room temperature. Then the microemulsion was put on ice for 5–10 min prior to adding aluminum triisopropoxide to get better crystallization. (Jahn, E.; Bulow, M.; Neissendorfer, F.; Fricke, R.; Richter-Mendau, J.; Becker, K.; Kraak P.; Birke, P.; Muller, D.; Thome, R.; Tissler, A. Eur. Patent 0 406 872 A2, 1990) Aluminum triisopropoxide was then added and the mixture was shaken vigorously for two minutes then aged at room temperature for two hours. Hydrofluoric acid was then added and the microemulsion was aged for another two hours at room temperature. The optically transparent, single-phase microemulsion was then transferred to a Teflon vessel for hydrothermal synthesis.

For control experiments without the microemulsion, all aqueous components, except aluminum triisopropoxide and hydrofluoric acid, were mixed at room temperature. The mixture was then placed on ice for 5–10 minutes prior to addition of aluminum triisopropoxide. After adding aluminum triisopropoxide, the mixture was shaken for two minutes and stirred for two hours at room temperature. Hydrofluoric acid was then added and the mixture was aged an additional two hours before hydrothermal synthesis.

Conventional heating: the Teflon-lined vessel (45 ml, model 4744, Parr Instrument Company) was wrapped in heating tape then heated to 180° C. and kept at this temperature for six hours without stirring. (Robson, H. *Microporous Mesoporous Mater.* 1998, 22, 495–670)

Microwave heating: The microemulsion was heated in a microwave oven (Milestone Ethos Plus, with six 100 mL Teflon vessels) to 180° C. over 2 min and kept at 180° C. for 17 min without stirring. The maximum power output of the microwave was adjusted to 500 Watts. For both heating methods, the product was collected by centrifugation after the temperature of the liquid decreased to room temperature. The liquid was then transferred to a 28 ml centrifuge tube and centrifuged at the speed of 14,500 rpm for 30 minutes. The collected solid was then washed with ethanol twice with the same centrifugation conditions. Finally, the product was dried overnight in a vacuum oven at 50° C.

Characterization: The morphology of the products was examined with scanning electron microscopy (LEO 982 FE-SEM) after coating with 800 to 1000 angstroms of metal (Au 60%, Pd 40%). The crystal structure was determined by powder X-ray diffraction (Philips PW3020) with an integration time of two hours and a step size of 0.02 degree/3 seconds.

Figure 4:
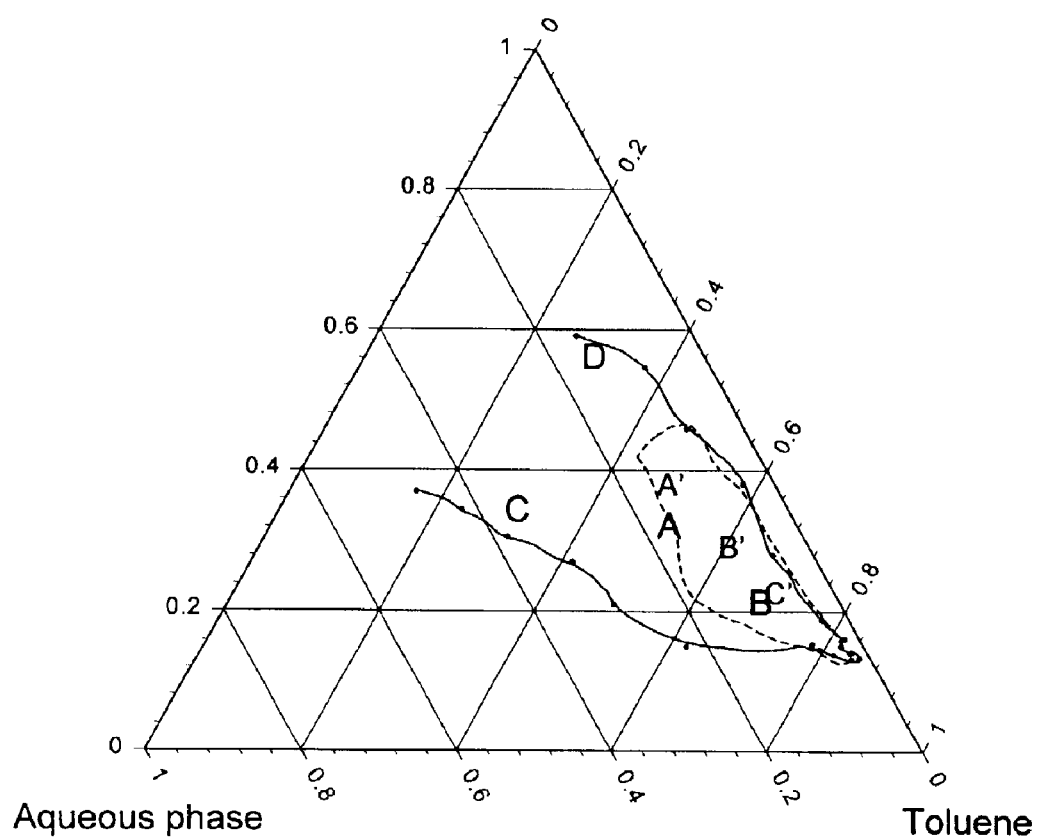
FIG. 4 shows phase diagrams with the surfactant CPC and cosurfactant butanol in the ratio of 2 to 1 by weight. The region enclosed in black line is the one with double the standard molar ratio of structure directing agent (1.2:1.0 triethylamine:phosphoric acid). The dash-line region represents standard molar ratio of triethylamine in the aqueous phase (0.6:1.0 triethylamine:phosphoric acid). A–D are compositions chosen for hydrothermal synthesis with double the molar ratio of triethylamine. A'–C' are compositions chosen for hydrothermal synthesis with the standard molar ratio of triethylamine.

Results: FIG. 4 shows the phase diagram for the surfactant CPC and cosurfactant butanol in the ratio of 2:1 by weight. The area between the lines on the diagram is where the single-phase microemulsion forms. Two single-phase regions are shown corresponding to two different molar ratios of triethylamine structure directing agent in aqueous phase. Phase behavior was determined using the standard molar ratio from the literature of 0.6 moles triethylamine per mole phosphoric acid and double the standard ratio (1.2 moles triethylamine per mole phosphoric acid). The larger single-phase region (enclosed with black line) corresponds to double the standard amount of structure directing agent. The differences in the two phase diagrams are likely due to pH changes in the aqueous phase that can strongly affect phase behavior. There is an acid-base equilibrium between triethylamine and phosphoric acid in the synthesis gel. The pH will thus be strongly dependent on the ratio of triethylamine to phosphoric acid. The ammonium salt formed when triethylamine reacts with phosphoric acid is only soluble in the aqueous phase. However, the unprotonated triethylamine is soluble in toluene. Therefore, there is also likely an equilibrium partitioning of triethylamine between the oil and aqueous phases that can affect pH as well as change the actual triethylamine concentration in the aqueous phase. Triethylamine and phosphoric acid were mixed together to ensure salt formation prior to the addition of toluene to minimize the solubilization of triethylamine in the oil phase. The bold letters A–D on the phase diagram represent compositions chosen for hydrothermal synthesis within the single-phase region with twice the standard molar ratio of triethylamine. Similarly, A'–C' are the compositions chosen for hydrothermal synthesis within the single-phase region with the standard synthesis gel. The points were selected to sample a wide range of single-phase microemulsion compositions.

Figure 5:
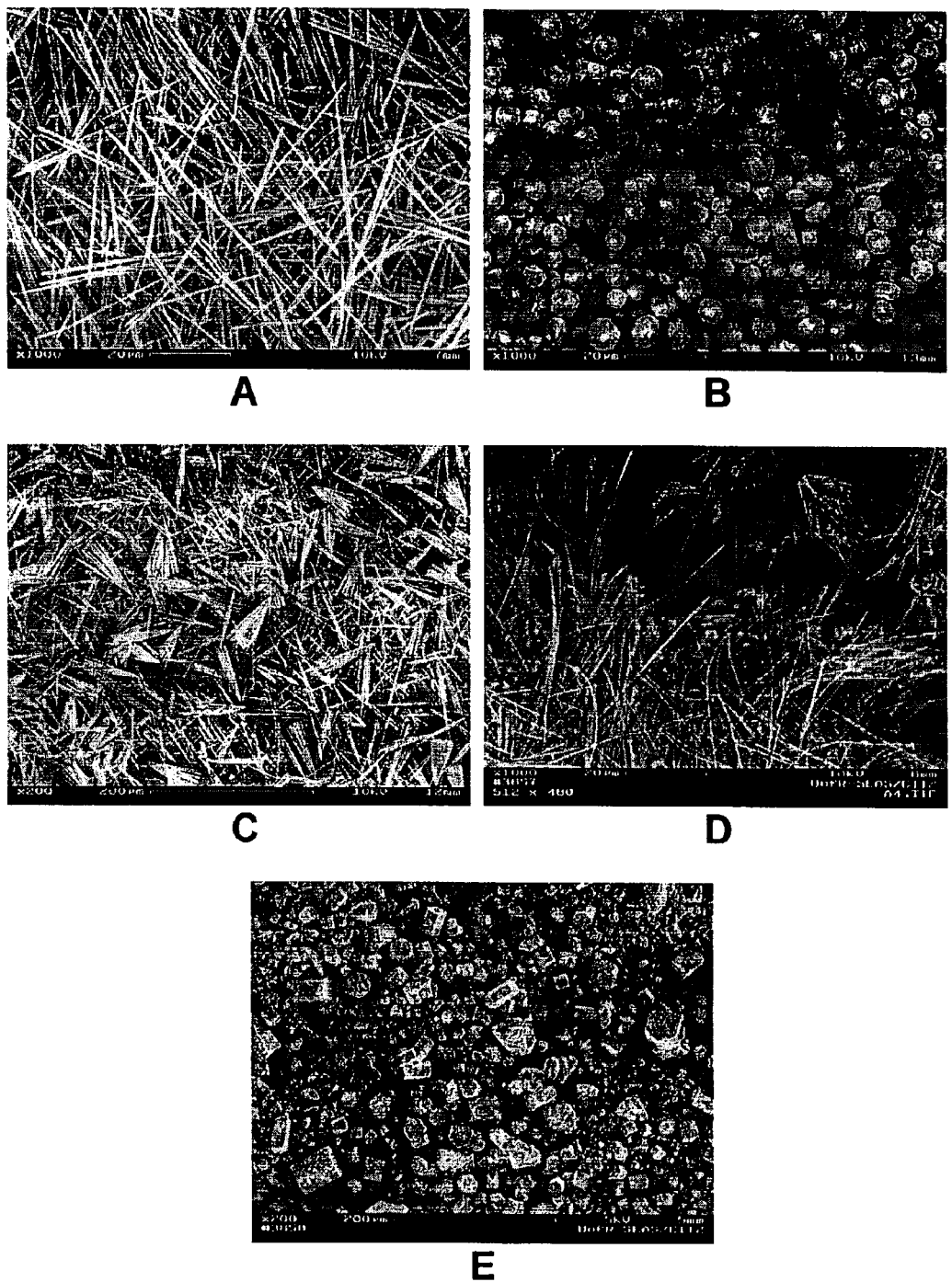
FIGS. 5A–E show products from conventional heating (6 hrs at 180° C.) with double the standard amount of triethylamine.

The crystal morphologies obtained by hydrothermal synthesis from the microemulsions with conventional heating are shown in FIG. 5. FIGS. 5A–5D correspond to compositions A–D respectively from FIG. 4. FIG. 5E is the control experiment using traditional hydrothermal synthesis without the microemulsion, which shows hexagonal columns with wide size distribution in the range from 5–40 $\mu$m in width and 5–55 $\mu$m in length. As seen in an earlier study (Yates, M. Z.; Ott, K. C.; Birnbaum, E. R.; McCleskey, T. M. *Angew. Chem. Int. Ed.* 2002, 41, 476–478), point A (49 wt % toluene, 33 wt % CPC/butanol, and 18 wt % synthesis gel) has crystals in the shape of long fibers (FIG. 5A), which posses lengths in the range from 20–70 $\mu$m and widths from 250–700 nm. The products obtained for point B (70 wt % toluene, 20 wt % CPC/butanol) have spherical or football-like shapes with the sizes from 5–20 $\mu$m (FIG. 5B). Synthesis at point C (30 wt % toluene, 34 wt % CPC/butanol) also produces fibrous crystal morphology (FIG. 5C). The morphology of these particles is similar to those synthesized at point A (FIG. 5A) except that many of the fibers are aggregated together in a fan-like formation. The product obtained from point D (30 wt % toluene, 56 wt % CPC/butanol) is a mixture of fibers and football-shaped crystals. The fibers are thinner than those obtained at point A and in some cases appear to bend.

Figure 6:
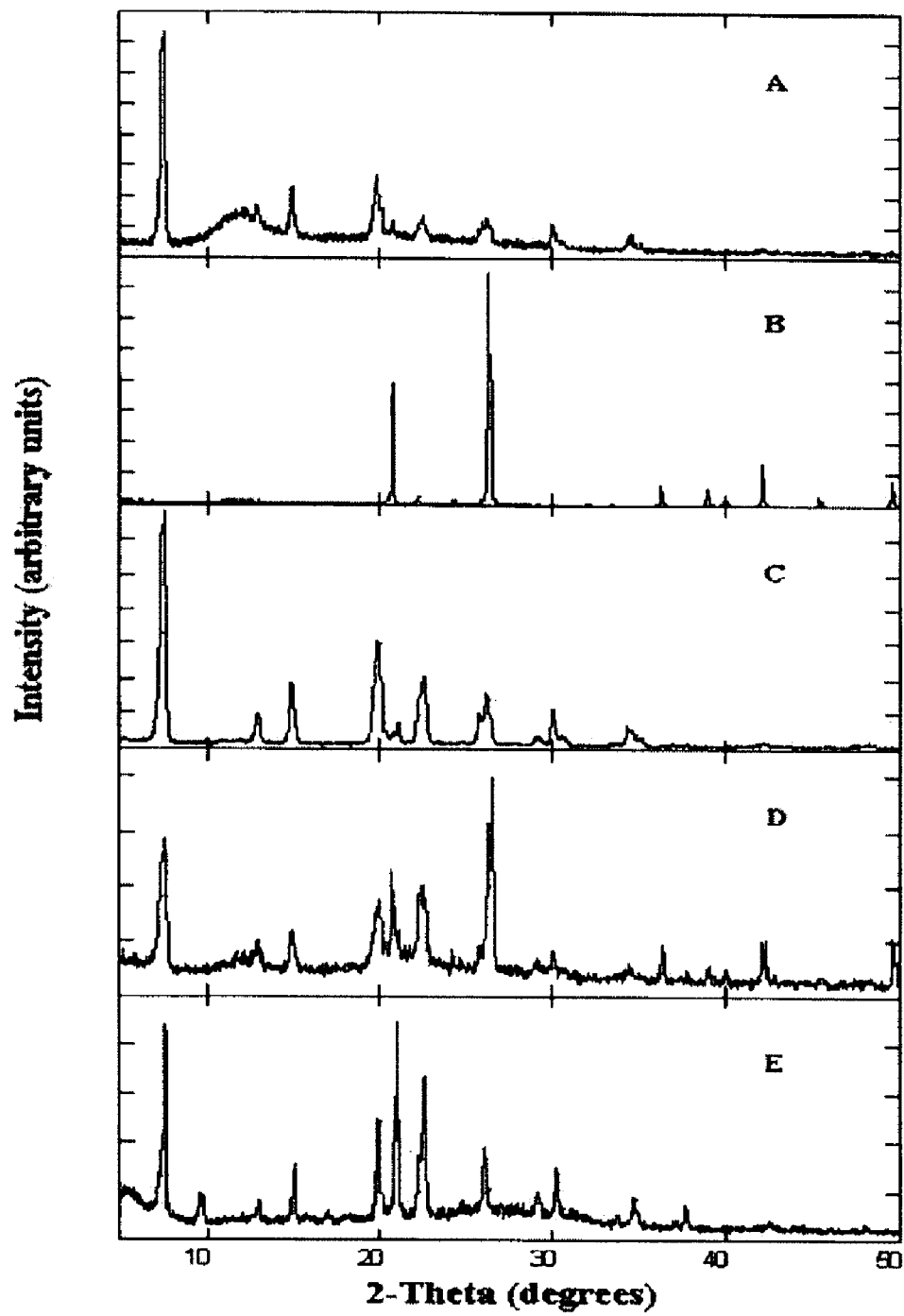
FIGS. 6A–E show X-ray diffraction patterns for products shown in FIGS. 5A to 5E respectively.
Figure 7:
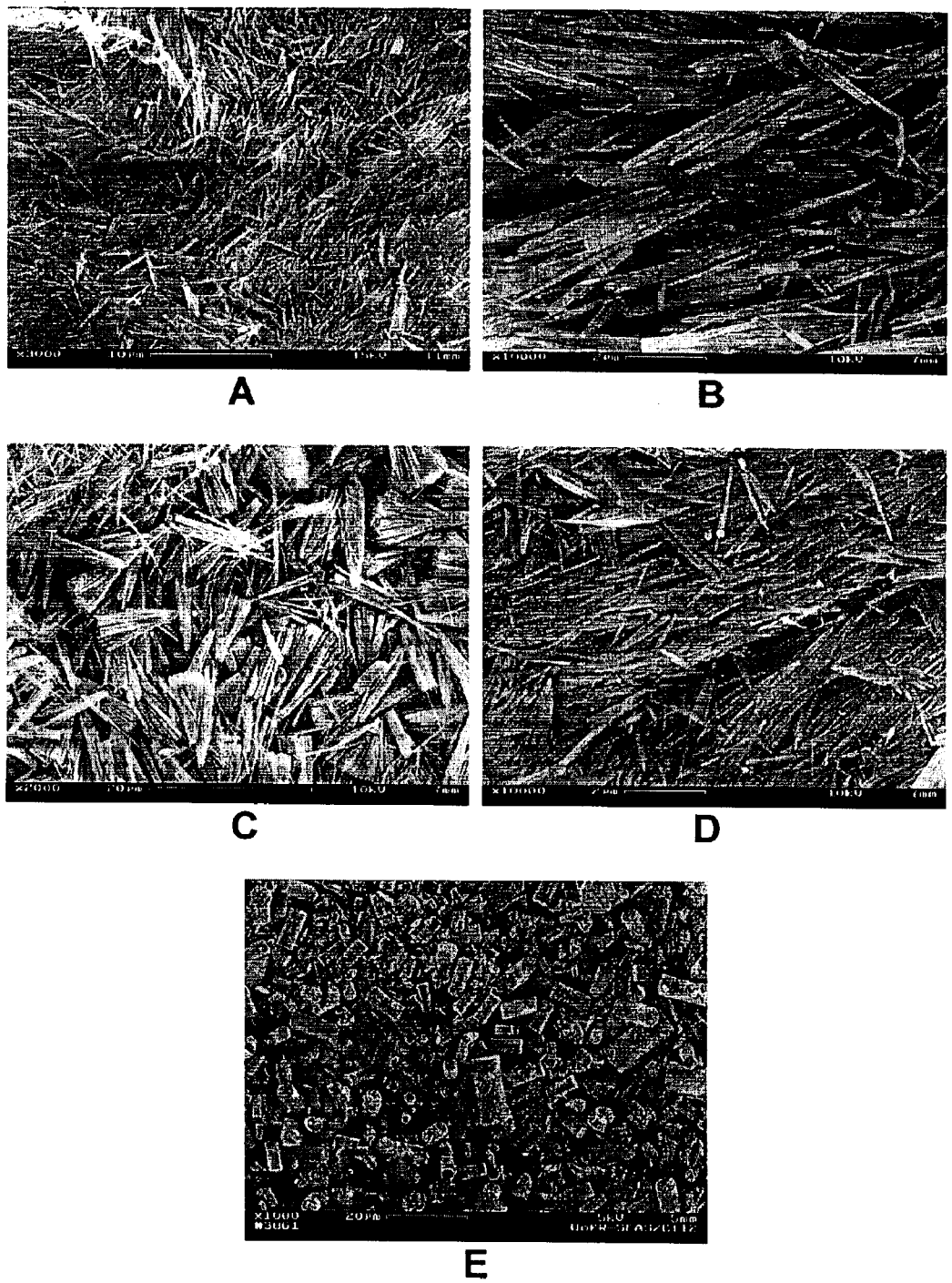
FIGS. 7A–E show products from microwave heating (17 min at 180° C.) with double the standard amount of triethylamine.
Figure 8:
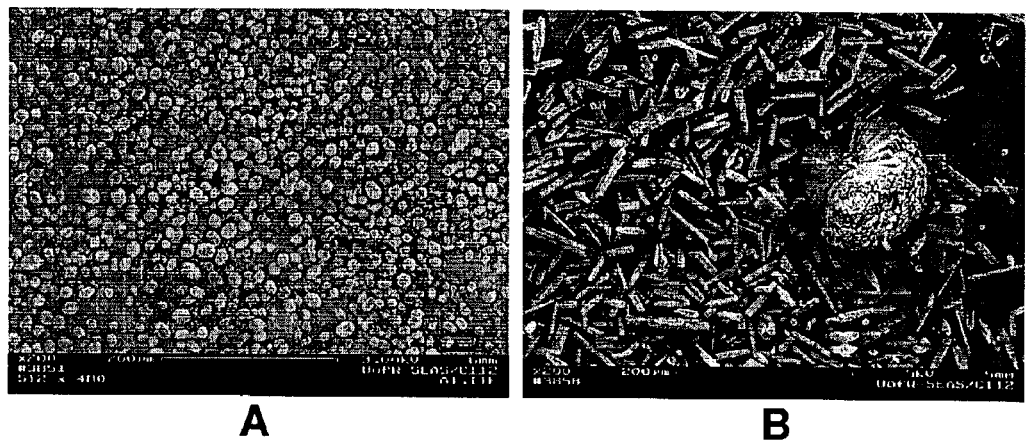
FIGS. 8A–B show products from conventional heating (6 hrs at 180° C.) with standard triethylamine concentration.
Figure 9:
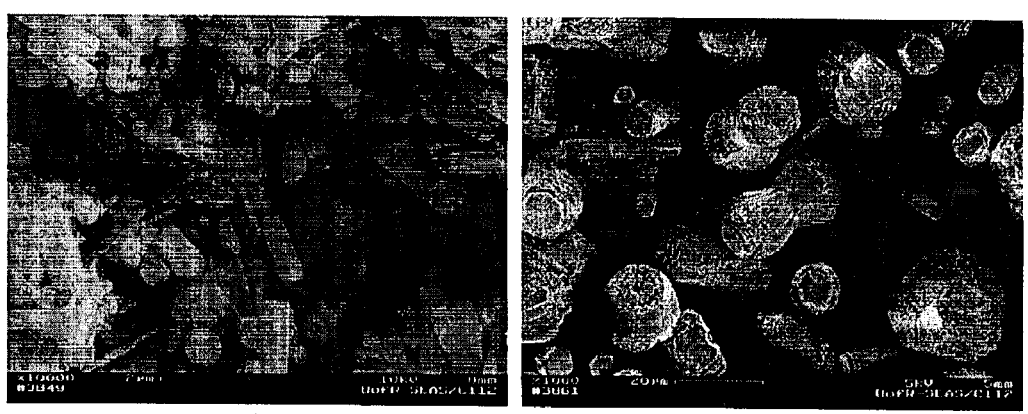
FIGS. 9A–B show products from microwave heating (17 min at 180° C.) with standard triethylamine concentration.
Figure 10:
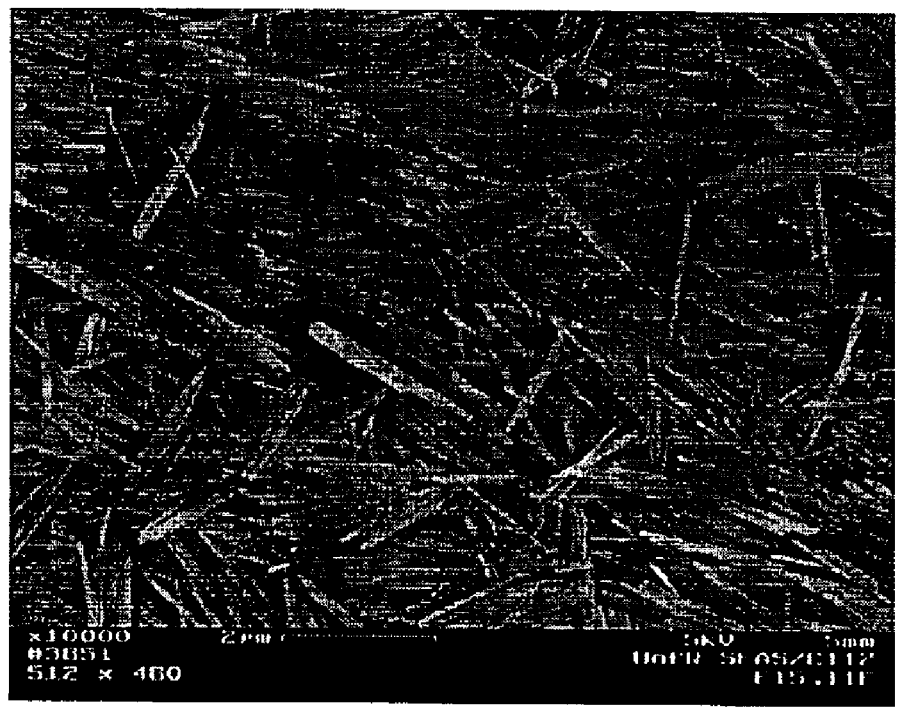
FIG. 10 shows AlPO$_4$-5 fibers crystallized by microwave heating (17 min at 180° C.) with double the standard amount of triethylamine from a microemulsion with the weight ratio of CPC to butanol is 3 to 1. The scale bar is 2 microns.

Powder X-ray diffraction was used to investigate the crystal structure of samples shown in FIGS. 5A–5E. The diffraction patterns are given in FIGS. 6A–6E, and correspond to crystals shown in FIGS. 5A–5E, respectively. The patterns shown in FIGS. 6A and 6C are that of the AFI crystal structure of $AlPO_4$-5, and are consistent with the pattern of the control experiment shown in FIG. 6E. The diffraction pattern in FIG. 6B is that of berlinite, the aluminum phosphate iso-structural analog of alpha quartz. FIG. 6D has features of both the AFI and berlinite patterns and thus indicates that the sample is a mixture of berlinite and $AlPO_4$-5. By comparison of FIGS. 5 and 6, it can be seen that the $AlPO_4$-5 crystals are fibrous, whereas the berlinite crystals are football-shaped or near spherical.

Berlinite is a dense phase material slightly more thermodynamically stable than $AlPO_4$-5. (Hu, Y.; Navrotsky, A.; Chen, C.-Y.; Davis, M. E. *Chem. Mater.* 1995, 7, 1816–1823.) In fact, we have observed that the $AlPO_4$-5 fibers undergo structural transformation to berlinite during the synthesis. For the reaction conducted at the composition of point B in FIG. 4, the collected product is a mixture of berlinite and $AlPO_4$-5 fibers when the reaction time is reduced to two hours (data not shown). The fraction of fibers observed gradually decreases as reaction time is increased. At a reaction time of six hours, fibers are no longer observed and the product is pure berlinite (FIGS. 5B and 6B).

Because of the complex nucleation and growth mechanism of molecular sieves, the results are often be influenced by many factors. For example, keeping the autoclave vessel agitated or static sometimes leads to different crystal structures in the synthesis of zeolite Beta. (Caullet, P.; Hazm, J.; Guth, J. L.; Joly, J. F.; Lynch, J.; Raatz, F. *Zeolites* 1992, 12, 240–250.) In the subject investigation, it was found that under some conditions stirring with a magnetically coupled stir bar can influence crystal quality and in some cases results in a different crystal structure. Stirring during the heat-up period has little effect as long as the reactor is maintained static after reaching 180° C. However, if the vessel is stirred at 1,100 rpm throughout the reaction, the product at the microemulsion composition of point A (FIG. 4) is transformed from nanoporous $AlPO_4$-5 to dense phase berlinite.

For the hydrothermal synthesis conducted in microwave oven, $AlPO_4$-5 fibers were obtained for all four compositions A–D as shown in FIGS. 7A–7D. Some fibers produced at point A with microwave heating reveal the same fan-like morphology as those produced at point C with conventional heating. By tuning the maximum power output and the time required to heat to 180° C. as described in experimental section, the numbers of aggregated fibers could be suppressed to a low level. For point C, the fibers of fan-like shape could also be observed. For point B and point D, the resulting materials are also $AlPO_4$-5 fibers but have a poor crystallization. There is amorphous material in the product, as determined by powder X-ray diffraction and scanning electron microscopy. The size of the fibers is around 2–4 $\mu$m in length and 150 nm in width for points A, B, and D. The fan-like shaped fibers have the largest particle size. The length of fibers is around 10 $\mu$m and up to 500 nm in width. FIG. 7E is the control experiment without the microemulsion. Unlike the fibers obtained for all compositions with microemulsion, the $AlPO_4$-5 crystals appear in the shape of circular columns with the size up to 20 $\mu$m in length and 8 $\mu$m in width.

The single-phase microemulsion region becomes smaller by changing the molar ratio of triethylamine to the standard value of 0.6 moles per mole of phosphoric acid (dash-line in FIG. 4). Three points were chosen for hydrothermal synthesis to represent the whole single-phase region. The compositions are point A' (50 wt % toluene, 35 wt % CPC/butanol), point B' (60 wt % toluene, 30 wt % CPC/butanol) and point C' (68 wt % toluene, 24 wt % CPC/butanol). All three reactions produced berlinite by conventional heating. FIG. 8A is a selected picture for point C'. The control reaction without the microemulsion produced hexagonal $AlPO_4$-5 crystals 4–15 $\mu$m in width and 30–70 $\mu$m in length with some multiply twinned crystals (FIG. 8B). By microwave heating, pure $AlPO_4$-5 crystals were produced for point A' mostly in the shape of circular columns with a small amount of fibers (FIG. 9A). For compositions B' and C', the products also contain columns and fibers (not shown). However, the X-ray diffraction shows the products from compositions B' and C' contain an impurity of cristobalite. Cristobalite is a dense phase material with a slightly higher enthalpy of formation than berlinite. (Hu, Y.; Navrotsky, A.; Chen, C.-Y.; Davis, M. E. *Chem. Mater.* 1995, 7, 1816–1823.) FIG. 9B shows the control experiment produced multiply twinned crystals in the formation of "dumb-bell" and "half-dumb-bell" shapes. The twinned crystals also appear as hexagonal columns in some cases. The size of the crystals is approximately 20 $\mu$m in length and 10 $\mu$m in diameter which is very similar dimensions to the product obtained for control experiment by microwave heating with double amount of triethylamine.

A very small single-phase region can be formed when the weight ratio of CPC to butanol is changed to 3:1 with double standard molar ratio of triethylamine. A reaction from this microemulsion (48 wt % toluene, 40 wt % CPC/butanol) demonstrated a poor crystallization for conventional heating. There were fibers with a large amount of amorphous material and some crystals of berlinite and cristobalite. However, pure $AlPO_4$-5 was obtained by microwave heating. The image (FIG. 10) revealed small fibers with lengths from 1–2 $\mu$m and widths from 30–55 nm.

General Synthesis Method Summary

Figure 11:
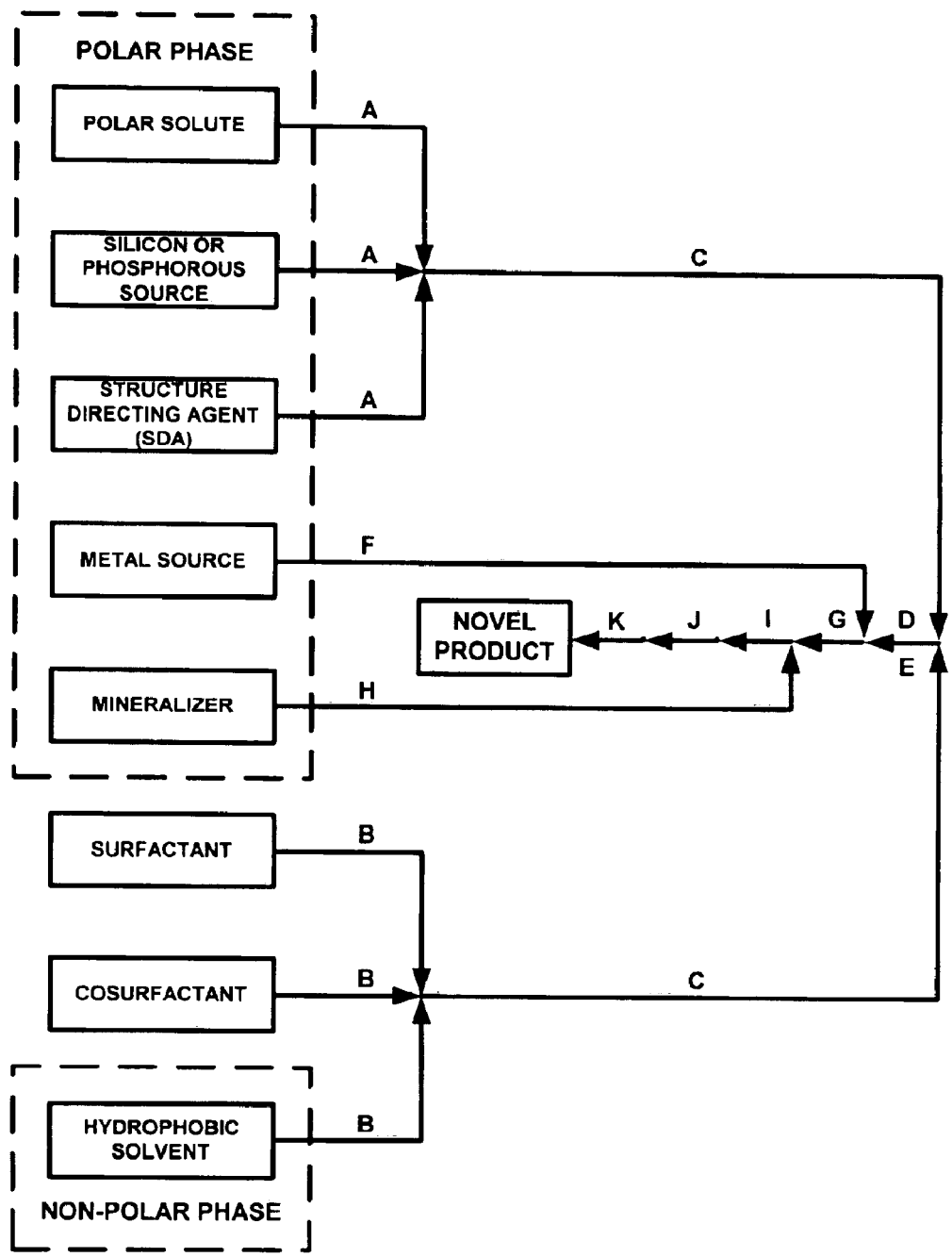
FIG. 11 is a flow diagram illustrating a general synthesis method summary for the subject invention.

FIG. 11 summarizes a preferred synthesis method for producing general novel zeotypes. The polar phase materials comprising a polar solute, a silicon or phosphorous source, and a structure directing agent, SDA, are mixed together in a suitable container (see "A" in FIG. 11). One or more surfactants/cosurfactants and the hydrophobic solvent are combined (see "B" in FIG. 11) and are added to the previously mixed three polar species and shaken for a short period of time to disperse the surfactants, perhaps a minute or until a clear single phase reverse microemulsion is formed (see "C" in FIG. 11). The reverse microemulsion is stirred for several hours, usually overnight, at a suitable temperature, usually about room temperature or the equivalent (see "D" in FIG. 11). The resultant reverse microemulsion is then cooled, usually in ice for several minutes, usually five to ten minutes (see "E" in FIG. 11). A metal source is then added and the mixture vigorously shaken for a short period of time, usually one to three minutes (see "F" in FIG. 11). The mixture is then aged, usually one to three hours, at a suitable temperature, usually about room temperature or the equivalent (see "G" in FIG. 11). A mineralizer is then added (see "H" in FIG. 11). The resultant mixture is aged, usually for one to three hours, at a suitable temperature, usually about room temperature or the equivalent (see "I" in FIG. 11). After transfer to a suitable heating container, usually a Teflon vessel, the mixture is heated to between about 100° C. to 220° C., preferably about 180° C., for a suitable time period, depending on the method of heating, conventional, microwave, or the like (see "J" in FIG. 11). With conventional heating the time is approximately five to seven hours without stirring. For microwave heating the time is about one to three minutes to heat to the 100° C. to 220° C. range, preferable about 180° C., and then held at that temperature for about an additional 15 to 20 minutes. The final novel product is then isolated, often by centrifugation followed by washing and then dried (see "K" in FIG. 11).

Exemplary Novel $AlPO_4$-5 Synthesis Method Summary

Figure 12:
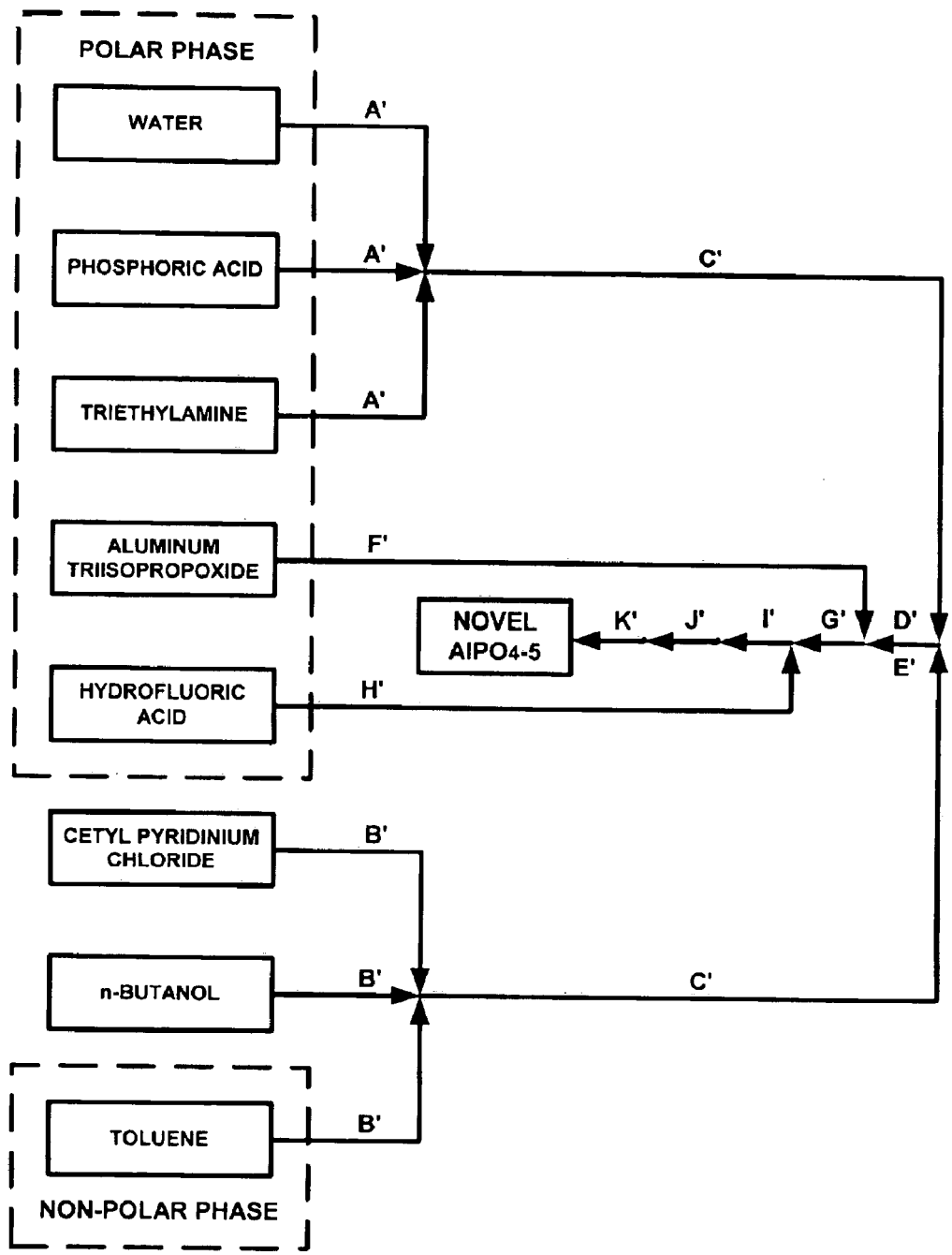
FIG. 12 is a flow diagram illustrating a novel AlPO$_4$-5 synthesis method summary for the subject invention.

FIG. 12 summarizes the subject synthesis method for novel $AlPO_4$-5 species and is also, applicable, with appropriate reactant substitutions and concentration alterations, for novel Silicalite-1 species. In this synthesis method summary the letter designations from FIG. 12 have primes to indicate equivalent steps to those depicted in FIG. 11 for the general zeolite procedure. The polar phase materials comprising water, phosphoric acid, and triethylamine, the SDA, are mixed together in a suitable container (see "A'" in FIG. 12). Cetyl pyridinium chloride, n-butanol, and toluene are combined (see "B'" in FIG. 12) and are added to the previously mixed three polar species and shaken for a short period of time to disperse the surfactants, usually about a minute or until a clear single phase reverse microemulsion is formed (see "C'" in FIG. 12). The reverse microemulsion is stirred for several hours, usually overnight, at a suitable temperature, usually about room temperature or the equivalent (see "D'" in FIG. 12). The resultant reverse microemulsion is then cooled, usually in ice for several minutes, usually five to ten minutes (see "E'" in FIG. 12). Aluminum triisopropoxide is then added and the mixture vigorously shaken for a short period of time, usually one to three minutes (see "F'" in FIG. 12). The mixture is then aged, usually one to three hours, often about two hours, at a suitable temperature, usually about room temperature or the equivalent (see "G'" in FIG. 12). Hydrofluoric acid is then added (see "H'" in FIG. 12). The resultant mixture is aged, usually for one to three hours, often two hours, at a suitable temperature, usually about room temperature or the equivalent (see "I'" in FIG. 12). After transfer to a suitable heating container, usually a Teflon vessel, the mixture is heated, usually to about 180° C., for a suitable time period, depending on the method of heating, conventional, microwave, or the like (see "J'" in FIG. 12). With conventional heating the time is approximately five to seven hours without stirring. For microwave heating the time is about one to two minutes to heat to about 180° C., and then held at that temperature for about an additional 15 to 20 minutes, usually about 17 minutes. The final novel product is then isolated, often by centrifugation followed by washing and then dried (see "K'" in FIG. 12).

In conclusion, the formation of microporous materials during hydrothermal synthesis is a complex process of self-assembly coupled with several simultaneous chemical reactions. The mechanism of nucleation and growth is poorly understood, but a recent study has shown that Zeolite A crystals are nucleated within amorphous precursor particles. (S. Mintova, N. H. Olsan, V. Valtchev, T. Bein, Science 1999, 283, 958–960.) The size and shape of the final crystal was the same as the amorphous precursor particle, but further crystal growth could be attained upon heating through Ostwald-ripening type mechanism. It has been proposed that $AlPO_4$-5 crystallization occurs through a similar route where an amorphous precursor consisting of a self-assembled array of inorganic and organic (structure-directing agent, SDA) material converts to $AlPO_4$-5 crystals upon heating. (I. Girnus, K. Jancke, R. Vetter, J. Richter-Mendau, and J. Caro, Zeolites 1995, 15, 33–39.) Concentrated water-in-oil microemulsions often form cylindrical aggregates, and these aggregates have been used as templates to form rod-shaped materials. (J. Tanori, M. P. Pileni, Langmuir 1997, 13, 639–646.) We believe that a similar templating mechanism may be operative in the molecular sieve synthesis. Such a mechanism would involve dual templating: the structure-directing agent templates the micropores within the crystal, while the surfactant aggregate surrounding the amorphous precursor templates the crystal size and shape. While we believe the surfactant aggregates template crystal nucleation, the final crystal size is much larger than typical surfactant aggregates, so crystal growth must continue outside the microemulsion droplets. Again, the microporous $AlPO_4$-5 fibers synthesized in the microemulsion may find application in optics, sensors, or membranes, where the high aspect ratio of the fibers will allow deposition onto substrates with controlled crystal orientation.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An $AlPO_4$-5 zeotype microporous crystalline species produced in a hydrothermal process comprising the steps:
   a) mixing water, phosphorous acid, and a structure directing agent to produce a first mixture;
   b) mixing cetyl pyridinium chloride, n-butanol, and toluene to produce a second mixture;
   c) combining said first and said second mixtures to produce a reverse microemulsion;
   d) stirring said reverse microemulsion for a first period and time at a first temperature;
   e) adding aluminum triisopropoxide to said stirred reverse microemulsion;
   f) aging said aluminum triisopropoxide containing reverse microemulsion for a second period of time at a second temperature;
   g) adding hydrofluoric acid to said aged aluminum triisopropoxide containing reverse microemulsion;

h) aging said hydrofluoric acid containing and aluminum triisopropoxide contain reverse microemulsion for a third period of time at a third temperature;

i) transferring said reverse microemulsion to a suitable heating vessel; and j) heating said transferred reverse microemulsion to a temperature of between about 100° C. and 220° C. for a selected period of time.

2. An $AlPO_4$-5 zeotype microporous crystalline species produced according to claim 1, wherein said structure directing agent contains an amine functional group.

3. An $AlPO_4$-5 zeotype microporous crystalline species produced according to claim 1, wherein said structure directing agent is triethylamine.

4. An $AlPO_4$-5 zeotype microporous crystalline species produced according to claim 1, wherein said temperature is between about 140° C. and 200° C.

5. An $AlPO_4$-5 zeotype microporous crystalline species produced according to claim 1, wherein said temperature is approximately 180° C.

6. An $AlPO_4$-5 zeotype microporous crystalline species produced according to claim 1, wherein said selected period of time is about five to seven hours with conventional heating and about 15 to 20 minutes with microwave heating.

7. An $AlPO_4$-5 zeotype microporous crystalline species produced according to claim 1, wherein said structure directing agent contains an amine functional group.

8. An $AlPO_4$-5 zeotype microporous crystalline species produced according to claim 1, wherein said structure directing agent is triethylamine.

9. An $AlPO_4$-5 zeotype microporous crystalline species produced in a hydrothermal process comprising the steps:

a) mixing water, phosphorous acid, and triethylamine to produce a first mixture;

b) mixing cetyl pyridinium chloride, n-butanol, and toluene to produce a second mixture;

c) combining said first and said second mixtures to produce a reverse microemulsion;

d) stirring said reverse microemulsion for overnight at room temperature;

e) adding aluminum triisopropoxide to said stirred reverse microemulsion;

f) aging said aluminum triisopropoxide containing reverse microemulsion for one to three hours at room temperature;

g) adding hydrofluoric acid to said aged aluminum triisopropoxide containing reverse microemulsion;

h) aging said hydrofluoric acid containing and aluminum triisopropoxide contain reverse microemulsion for one to three hours at room temperature;

i) transferring said reverse microemulsion to a suitable heating vessel; and j) heating said transferred reverse microemulsion to a temperature of between about 100° C. and 220° C. for a selected period of time.

10. An $AlPO_4$-5 zeotype microporous crystalline species produced according to claim 9, wherein said temperature is between about 140° C. and 200° C.

11. An $AlPO_4$-5 zeotype microporous crystalline species produced according to claim 9, wherein said temperature is approximately 180° C.

12. An $AlPO_4$-5 zeotype microporous crystalline species produced according to claim 9, wherein said selected period of time is about five to seven hours with conventional heating and about 15 to 20 minutes with microwave heating.

13. A zeotype microporous crystalline fiber structure comprising $AlPO_4$-5 with linear micropores running approximately parallel to a long axis of said fiber.

* * * * *